United States Patent
Kim et al.

(10) Patent No.: US 10,148,299 B2
(45) Date of Patent: Dec. 4, 2018

(54) METHOD AND APPARATUS FOR CANCELLING INTERFERENCE AND RECEIVING SIGNAL IN WIRELESS COMMUNICATION SYSTEM

(71) Applicant: LG ELECTRONICS INC., Seoul (KR)

(72) Inventors: Hyungtae Kim, Seoul (JE); Kijun Kim, Seoul (KR); Yunjung Yi, Seoul (KR); Byounghoon Kim, Seoul (KR); Hanjun Park, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/646,483

(22) Filed: Jul. 11, 2017

(65) Prior Publication Data

US 2017/0317703 A1    Nov. 2, 2017

Related U.S. Application Data

(63) Continuation of application No. 14/913,947, filed as application No. PCT/KR2014/010111 on Oct. 27, 2014, now Pat. No. 9,735,818.

(60) Provisional application No. 62/039,384, filed on Aug. 19, 2014, provisional application No. 62/034,779, filed on Aug. 8, 2014, provisional application No. 62/009,316, filed on Jun. 8, 2014, provisional application No. 61/896,631, filed on Oct. 28, 2013.

(51) Int. Cl.
*H04B 1/10* (2006.01)
*H04B 1/12* (2006.01)

(52) U.S. Cl.
CPC ............. *H04B 1/123* (2013.01); *H04B 1/126* (2013.01)

(58) Field of Classification Search
CPC ............................... H04B 1/123; H04B 1/126
USPC ...... 455/401, 452.1, 452.2, 10, 67.16, 115.1, 455/135, 222, 213, 226.3, 283, 423, 63.1, 455/562.1; 370/201, 252, 315, 330, 329, 370/336; 1/1
See application file for complete search history.

(56) References Cited

U.S. PATENT DOCUMENTS 8,855,040 B1 * 10/2014 Gossett ................. H04J 11/005
                                                    370/315
9,735,818 B2 *  8/2017 Kim ....................... H04B 1/123
(Continued)

FOREIGN PATENT DOCUMENTS

KR    10-2011-0048398 A    5/2011
KR    10-2011-0136705 A    12/2011

*Primary Examiner* — Tan H Trinh
(74) *Attorney, Agent, or Firm* — Birch, Stewart, Kolasch & Birch, LLP

(57) ABSTRACT

A method for cancelling interference and receiving a signal by a user equipment in a wireless communication system, the method includes identifying assistance information for cancelling an interference signal transmitted from an interfering base station; cancelling the interference signal based on the assistance information; and receiving a desired signal from a serving base station, wherein the user equipment assumes a part of the assistance information for cancelling the interference signal as a limited value and then receives the interference signal, and wherein a modulation order of the interference signal as the part of the assistance information is smaller than or equal to a specific value as the limited value.

12 Claims, 13 Drawing Sheets

(56) References Cited

U.S. PATENT DOCUMENTS

| | | | | |
|---|---|---|---|---|
| 2003/0231706 | A1 | 12/2003 | Hwang | |
| 2006/0039454 | A1* | 2/2006 | Cioffi | H04B 1/126 375/222 |
| 2008/0132281 | A1* | 6/2008 | Kim | H04B 7/063 455/562.1 |
| 2008/0239936 | A1* | 10/2008 | Doberstein | H04L 1/0055 370/201 |
| 2010/0034146 | A1 | 2/2010 | Hou et al. | |
| 2010/0069010 | A1* | 3/2010 | Karakayali | H04B 7/024 455/63.1 |
| 2011/0069736 | A1 | 3/2011 | Coralli et al. | |
| 2011/0081864 | A1* | 4/2011 | Srinivas | H04B 1/7103 455/63.1 |
| 2012/0045995 | A1* | 2/2012 | Nakano | H04J 11/0036 455/63.1 |
| 2012/0224554 | A1 | 9/2012 | Park | |
| 2013/0094547 | A1 | 4/2013 | Kang et al. | |
| 2013/0114437 | A1 | 5/2013 | Yoo et al. | |
| 2013/0279423 | A1 | 10/2013 | Ahn et al. | |
| 2013/0287009 | A1* | 10/2013 | Ahn | H04W 72/1289 370/336 |
| 2014/0126403 | A1* | 5/2014 | Siomina | H04W 24/10 370/252 |
| 2014/0128115 | A1 | 5/2014 | Siomina et al. | |
| 2014/0148179 | A1 | 5/2014 | Das et al. | |
| 2014/0293890 | A1 | 10/2014 | Davydov et al. | |
| 2014/0293971 | A1* | 10/2014 | Yoo | H04W 56/003 370/336 |
| 2014/0313990 | A1 | 10/2014 | Nammi | |
| 2014/0334440 | A1 | 11/2014 | Wong et al. | |
| 2015/0018001 | A1* | 1/2015 | Kim | H04B 1/1027 455/452.2 |
| 2015/0078191 | A1 | 3/2015 | Jöngren et al. | |
| 2015/0139004 | A1 | 5/2015 | Fodor et al. | |
| 2015/0147994 | A1* | 5/2015 | Tsai | H04B 1/1027 455/296 |
| 2015/0280887 | A1 | 10/2015 | Ko et al. | |
| 2015/0282190 | A1* | 10/2015 | Jung | H04J 11/005 370/330 |
| 2015/0326260 | A1 | 11/2015 | Sun et al. | |
| 2016/0021565 | A1* | 1/2016 | Kim | H04L 5/005 370/329 |
| 2016/0100413 | A1* | 4/2016 | Hwang | H04W 72/082 370/330 |
| 2016/0119936 | A1 | 4/2016 | Kim et al. | |
| 2016/0173262 | A1* | 6/2016 | Davydov | H04W 76/14 370/329 |
| 2016/0182183 | A1* | 6/2016 | Wang | H04L 1/0001 455/423 |
| 2016/0197693 | A1 | 7/2016 | Nammi et al. | |
| 2016/0295597 | A1 | 10/2016 | Franz et al. | |
| 2017/0134150 | A1* | 5/2017 | Hwang | H04B 7/0452 |
| 2017/0135114 | A1* | 5/2017 | Hwang | H04L 25/0202 |

* cited by examiner

FIG. 5
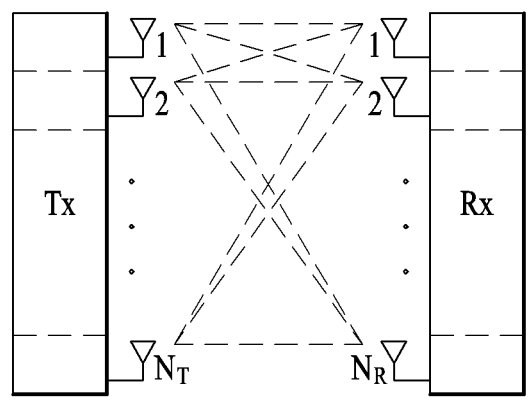
(a)
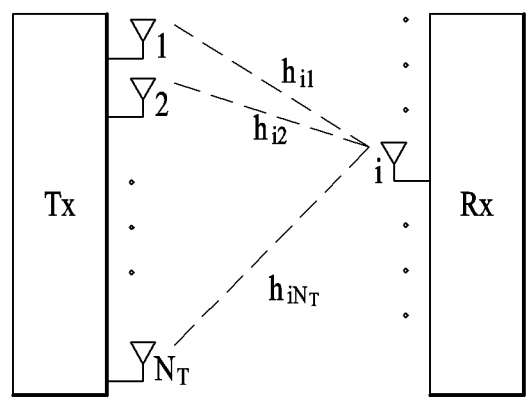
(b)

FIG. 14

```
CRS-AssistanceInfo  ::= SEQUENCE {
        crs-AssistanceInfoId        crs-AssistanceInfoId,
        physCellId                  physCellId,
        antennaPortsCount           ENUMERATED {an1, an2, an4, sparel},
        mbsfn-SubframeConfigList    MBSFN-SubframeConfigList,
        ...
}
```

FIG. 15

```
DMRS-AssistanceInfo  ::=    SEQUENCE {
        dmrs-AssistanceInfoId       dmrs-AssistanceInfoId,
        scramblingIdentity          INTEGER (0..503),
        n_SCID                      INTEGER (0,1),
        qcl-CRS-Info                CRS-AssistanceInfoId,
        ...
}
```

METHOD AND APPARATUS FOR CANCELLING INTERFERENCE AND RECEIVING SIGNAL IN WIRELESS COMMUNICATION SYSTEM

CROSS-REFERENCE TO RELATED APPLICATIONS

This Application is a Continuation of U.S. patent application Ser. No. 14/913,947 filed on Feb. 23, 2016 (now U.S. Pat. No. 9,735,818 issued on Aug. 15, 2017), which is the National Phase of PCT International Application No. PCT/KR2014/010111 filed on Oct. 27, 2014, which claims the benefit under 35 U.S.C. § 119(e) to U.S. Provisional Application Nos. 62/039,384 filed on Aug. 19, 2014, 62/034,779 filed on Aug. 8, 2014, 62/009,316 filed on Jun. 8, 2014 and 61/896,631 filed on Oct. 28, 2013, all of which are hereby expressly incorporated by reference into the present application.

BACKGROUND OF THE INVENTION

Field of the Invention

The present invention relates to a wireless communication system, and more particularly, to a method for cancelling interference and receiving a signal in a wireless communication system and an apparatus for supporting the same.

Discussion of the Related Art

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

SUMMARY OF THE INVENTION

Based on the aforementioned discussion, an object of the present invention is to provide a method and device for transmitting and receiving channel state information in a wireless communication system.

The technical objects that can be achieved through the present invention are not limited to what has been particularly described hereinabove and other technical objects not described herein will be more clearly understood by persons skilled in the art from the following detailed description.

To solve the aforementioned problem, according to one embodiment of the present invention, a method for enabling a user equipment to cancel interference and receive a signal in a wireless communication system comprises the steps of receiving assistance information for cancelling an interference signal transmitted from an interfering base station; and cancelling the interference signal on the basis of the assistance information and receiving a desired signal from a serving base station, wherein the user equipment assumes a part of the assistance information for cancelling the interference signal as a limited value and then receives the interference signal.

According to another embodiment of the present invention, a user equipment for cancelling interference and receiving data in a wireless communication system comprises a radio frequency (RF) unit; and a processor, wherein the processor is configured to receive assistance information for cancelling an interference signal transmitted from an interfering base station, and cancel the interference signal on the basis of the assistance information and receive a desired signal from a serving base station, and the user equipment assumes a part of the assistance information for cancelling the interference signal as a limited value and then receives the interference signal.

The followings may commonly be applied to the embodiments of the present invention.

The user equipment may assume that the number of data layers of the interference signal is smaller than or equal to the number of data layers of the desired signal.

The user equipment may assume that the number of data layers of the interference signal is smaller than or equal to a value obtained by subtracting the number of data layers of the desired signal from the number of receiving antennas of the user equipment.

The user equipment may assume that a modulation order of the interference signal is smaller than or equal to a value obtained by subtracting the number of data layers of the desired signal from the number of receiving antennas of the user equipment.

The user equipment may further calculate PMI of the interfering base station on the basis of the number of data layers of the assumed interference signal.

The user equipment may further receive an indication of whether a starting symbol of an interference Physical Downlink Shared Channel (PDSCH) can be calculated through a Physical Control Format Indicator Channel (PCFICH) of an interfering base station, through Radio Resource Control (RRC) signaling.

The user equipment may further receive information on an interference Demodulation Reference Signal (DM-RS), which may be connected with a Common Reference Signal (CRS) of an interfering base station according to a Quasi Co-Location (QCL) behavior.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas;

FIG. 14 is a diagram illustrating an example of CRS assistance information according to the present invention;

FIG. 15 is a diagram illustrating an example of DM-RS assistance information according to the present invention;

DETAILED DESCRIPTION OF THE INVENTION

Figure 1:
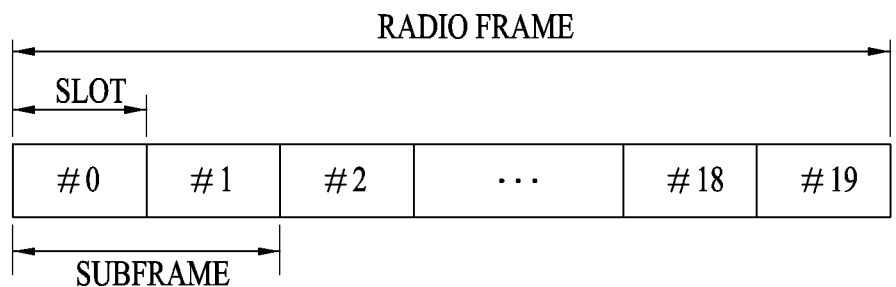
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wireless MAN-OFDMA reference system) and advanced IEEE 802.16m (wireless MAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
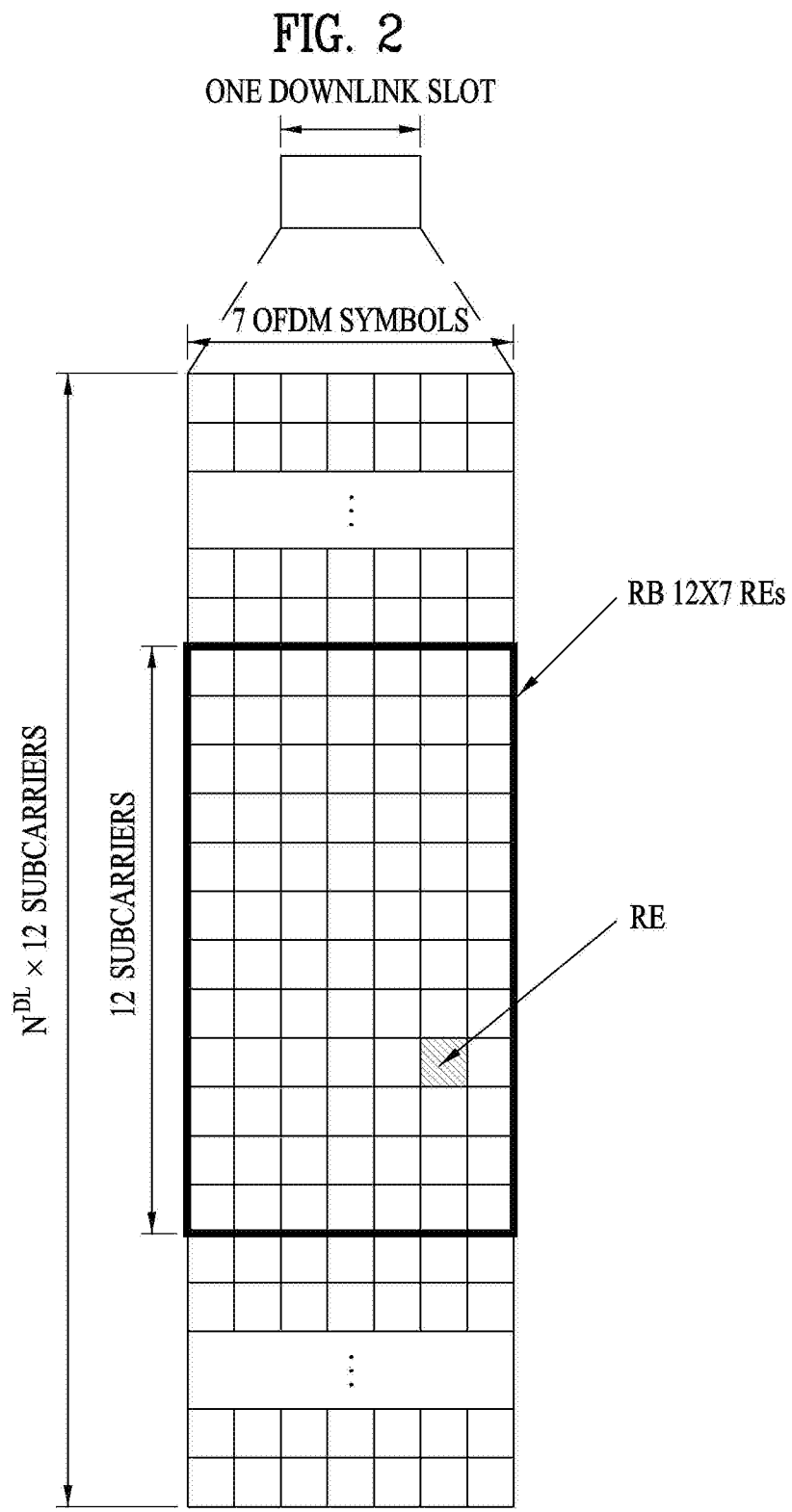
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
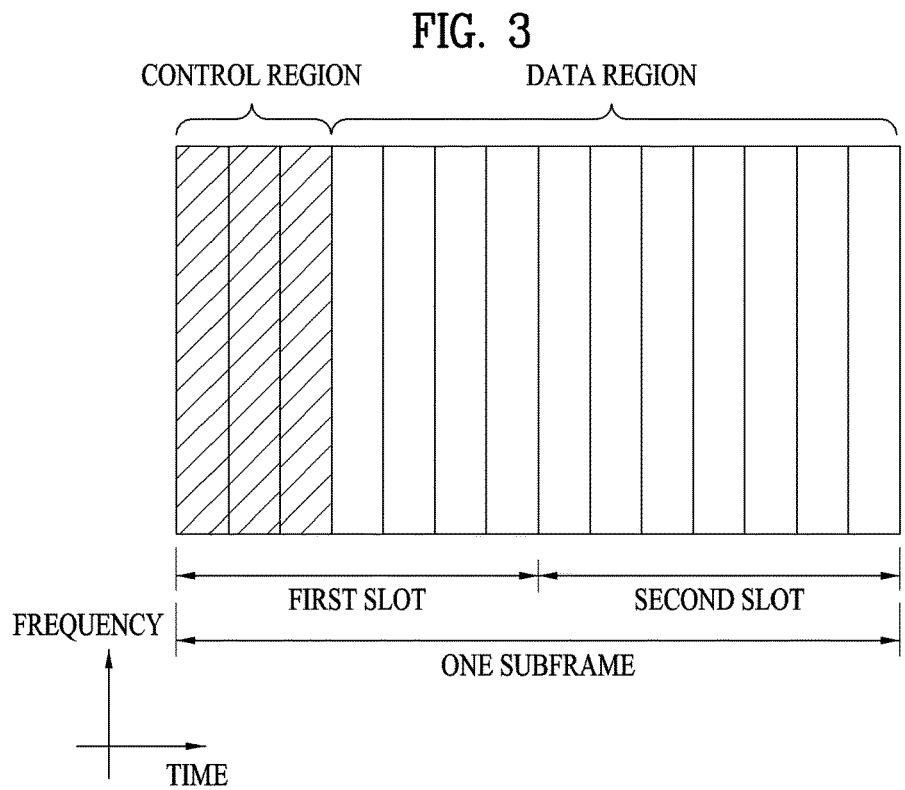
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
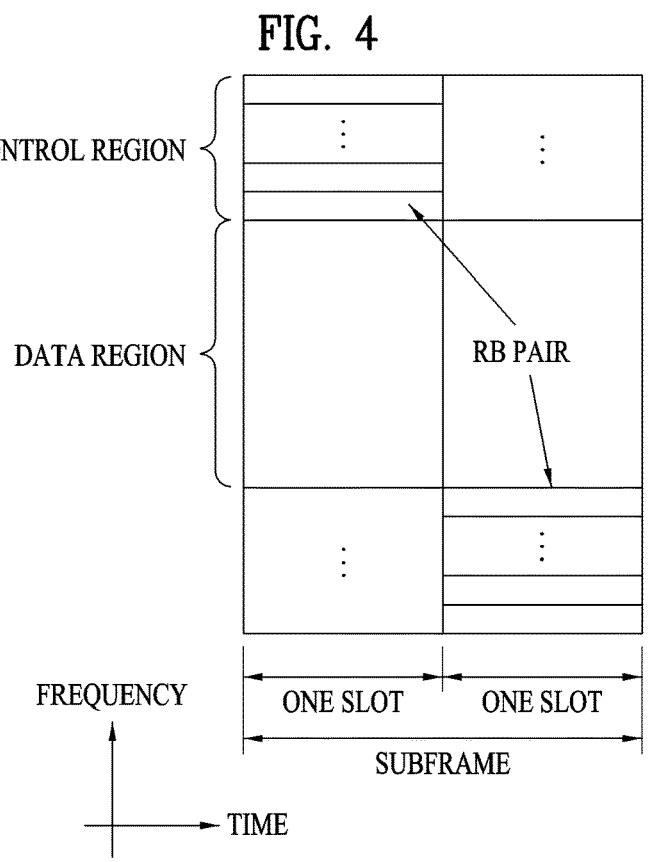
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO system

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vectors may be expressed as follows, using a diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} \quad \text{[Equation 4]}$$

$$= Ps$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $W_{ij}$ refers to a weight between an $i^{th}$ Tx antenna and $j^{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector(s) have different values. In the case of spatial diversity, the same signal is repeatedly transmitted through a plurality of channel paths and thus elements of information vectors(s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y = [y_1, y_2, \ldots, y_{N_R}]^T \quad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}] \quad \text{[Equation 7]}$$

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n = [n_1, n_2, \ldots, n_{N_R}]^T \quad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
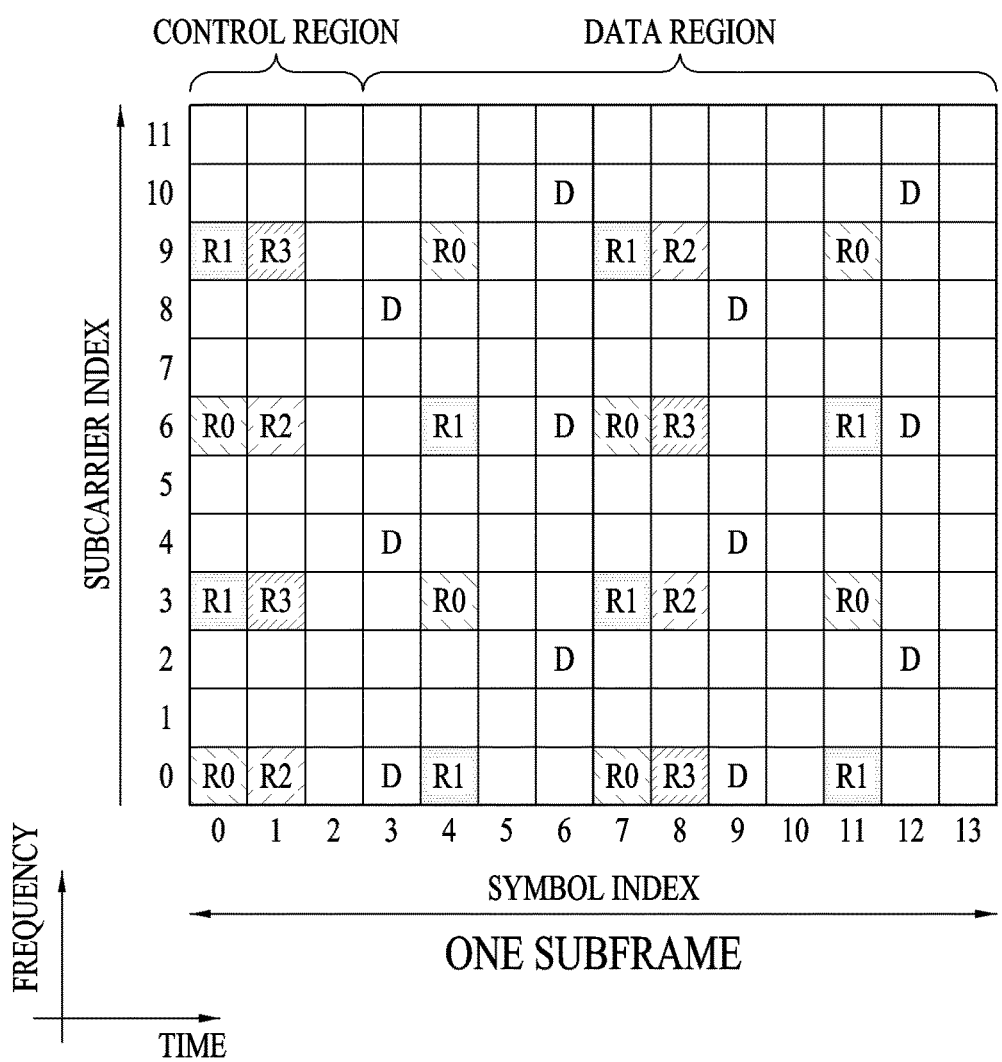
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
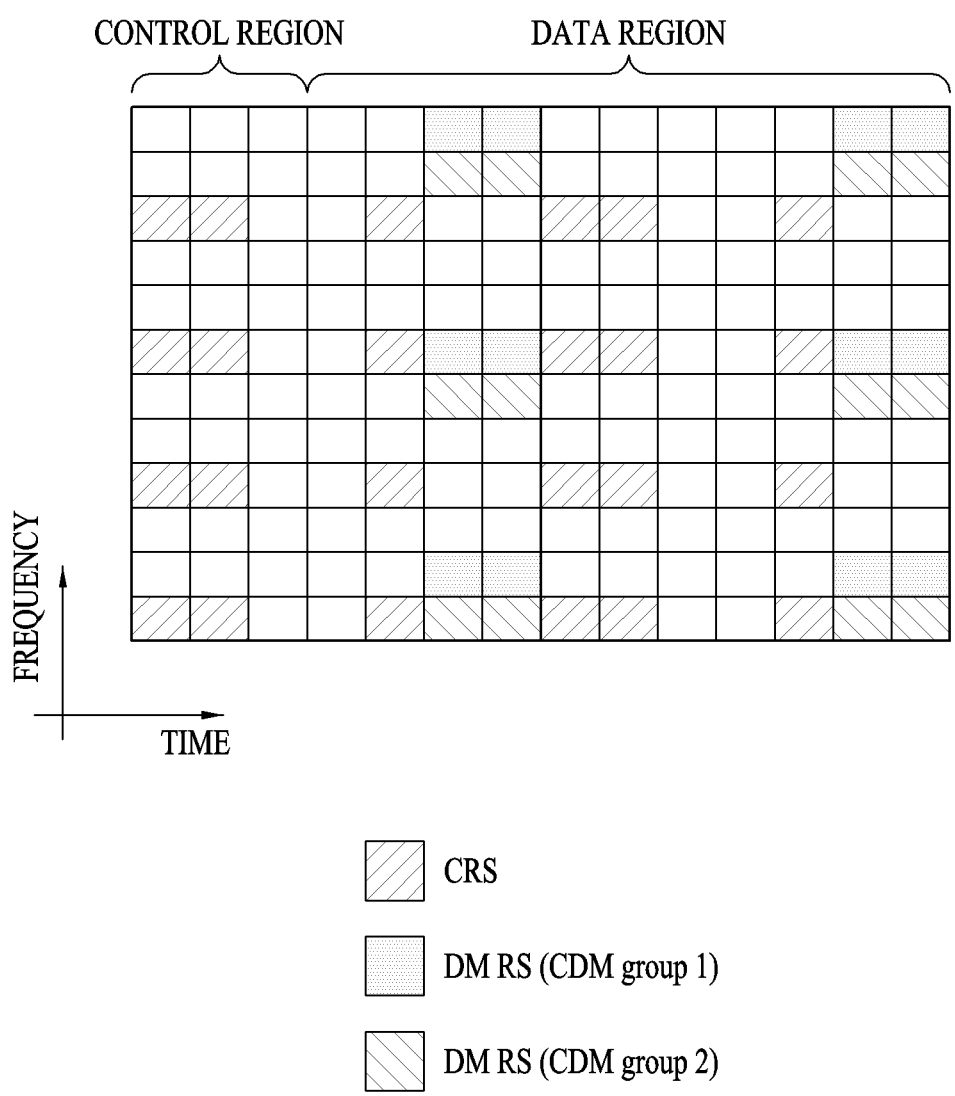
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
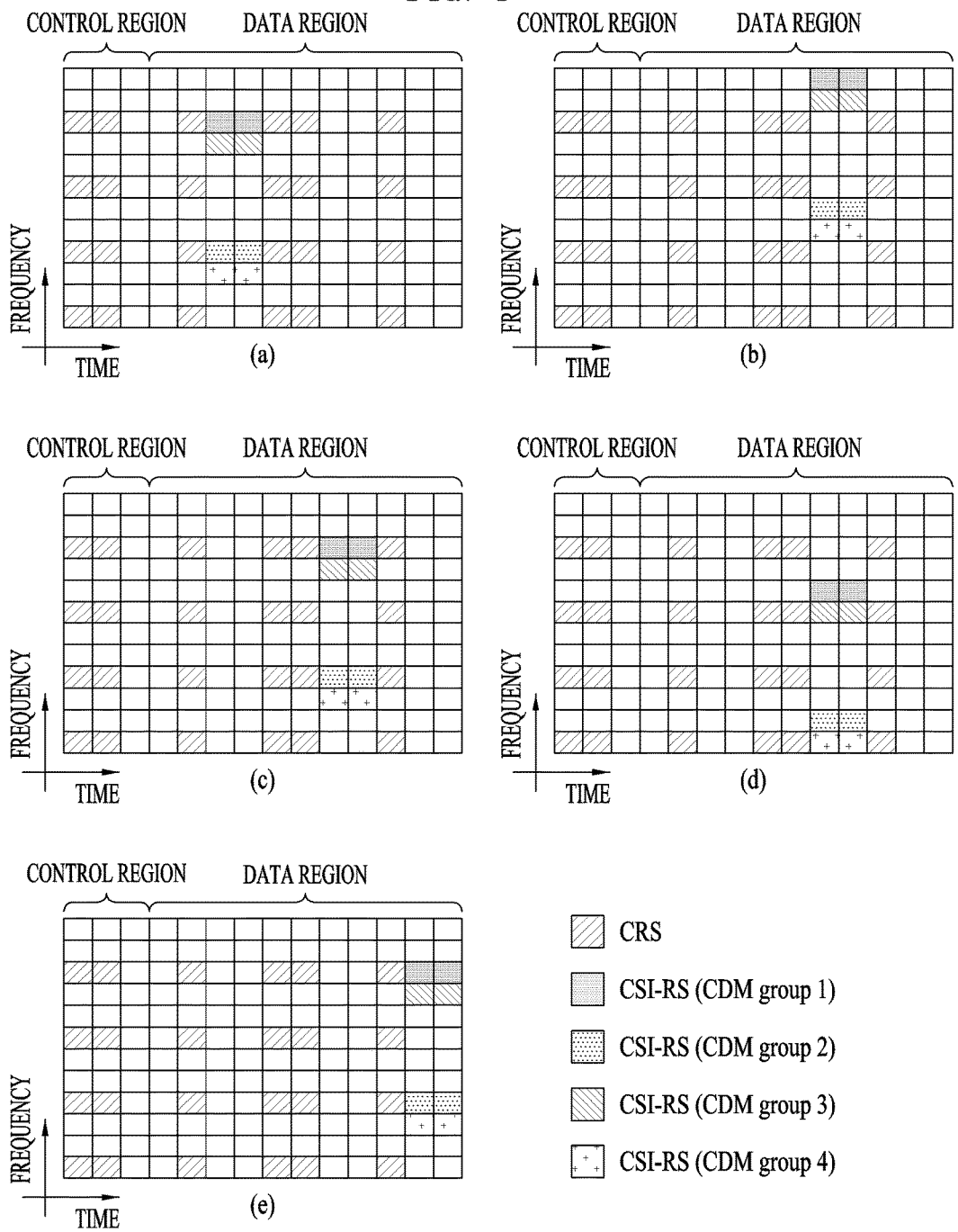
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns of FIGS. 6 to 8 are only exemplary, and application of various embodiments of the present invention is not limited to a specific RS pattern. That is, various embodiments of the present invention may equally be applied to even a case where RS patterns different from those of FIGS. 6 to 8 are defined and used.

CSI-RS Configuration

Among the plurality of CSI-RSs and the plurality of IMRs, which are configured for the UE, one CSI process may be defined by associating one CSI-RS resource for signal measurement with one interference measurement resource (IMR) for interference measurement. The UE feeds back CSI information derived from different CSI processes to the network (for example, base station) by using an independent period and subframe offset.

In other words, each CSI process has independent CSI feedback configuration. Association information on the CSI-RS resource and the IMR resource and CSI feedback configuration may be notified from the base station to the UE through higher layer signaling such as RRC per CSI process. For example, it is assumed that three CSI processes are configured for the UE as illustrated in Table 1.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 respectively represent CSI-RS received from a cell 1 which is a serving cell of the UE and CSI-RS received from a cell 2 which is a neighboring cell which joins cooperation. It is assumed that IMR configured for each CSI process of Table 1 is configured as illustrated in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

In IMR 0, the cell 1 performs muting, the cell 2 performs data transmission, and the UE is configured to measure interference from the other cells except the cell 1. Likewise, in IMR 1, the cell 2 performs muting, the cell performs data transmission, and the UE is configured to measure interference from the other cells the cell 2. Also, in IMR 2, both the cell 1 and the cell 2 perform muting, and the UE is configured to measure interference from the other cells except the cell 1 and the cell 2.

Accordingly, as illustrated in Table 1 and Table 2, CSI information of the CSI process 0 represents optimized RI, PMI and CQI information if data are received from the cell 1. CSI information of the CSI process 1 represents optimized RI, PMI and CQI information if data are received from the cell 2. CSI information of the CSI process 2 represents optimized RI, PMI and CQI information if data are received from the cell 1 and if there is no interference from the cell 2.

It is preferable that a plurality of CSI processes configured for one UE share dependent values. For example, in case of joint transmission (JP) of the cell 1 and the cell 2, if a CSI process 1 which regards a channel of the cell 1 as a signal part and a CSI process 2 which regards a channel of the cell 2 as a signal part are configured for one UE, the CSI process 1 and the CSI process 2 need to have the same rank and subband indexes in order to easily perform JT scheduling.

A period or pattern for transmission of the CSI-RS may be configured by the base station. In order to measure the CSI-RS, the UE should know CSI-RS configuration for each CSI-RS antenna port of a cell to which the UE belongs. The CSI-RS configuration may include a downlink subframe index to which the CSI-RS is transmitted, time-frequency location (for example, CSI-RS pattern as shown in FIGS. 8(a) to 8(e)) of a CSI-RS resource element (RE) within a transmission subframe, and a CSI-RS sequence (sequence used for CSI-RS and generated pseudo-randomly in accordance with a predetermined rule on the basis of a slot number, cell ID, a CP length, etc.). That is, a plurality of CSI-RS configurations may be used by a given base station, and the base station may notify UEs within a cell of a CSI-RS configuration, which will be used for the UEs, among a plurality of CSI-RS configurations.

Also, since the CSI-RS for each antenna port is needed to be identified from another one, resources to which the CSI-RS for each antenna port is transmitted should be orthogonal to one another. As described with reference to FIG. 8, the CSI-RSs for each antenna port may be multiplexed in accordance with an FDM mode, a TDM mode and/or a CDM mode by using orthogonal frequency resources, orthogonal time resources and/or orthogonal code resources.

When the base station reports information (CSI-RS configuration) on CSI-RS to UEs within a cell, the base station should first notify the UEs of information on time-frequency into which the CSI-RS for each antenna port is mapped. In more detail, the information on time may include subframe numbers to which the CSI-RS is transmitted, a transmission period of the CSI-RS, subframe offset for transmission of the CSI-RS, and OFDM symbol number to which a CSI-RS resource element (RE) of a specific antenna is transmitted. The information on frequency may include a frequency spacing to which the CSI-RS resource element (RE) of a specific antenna is transmitted, offset or shift value of RE on a frequency axis, etc.

Figure 9:
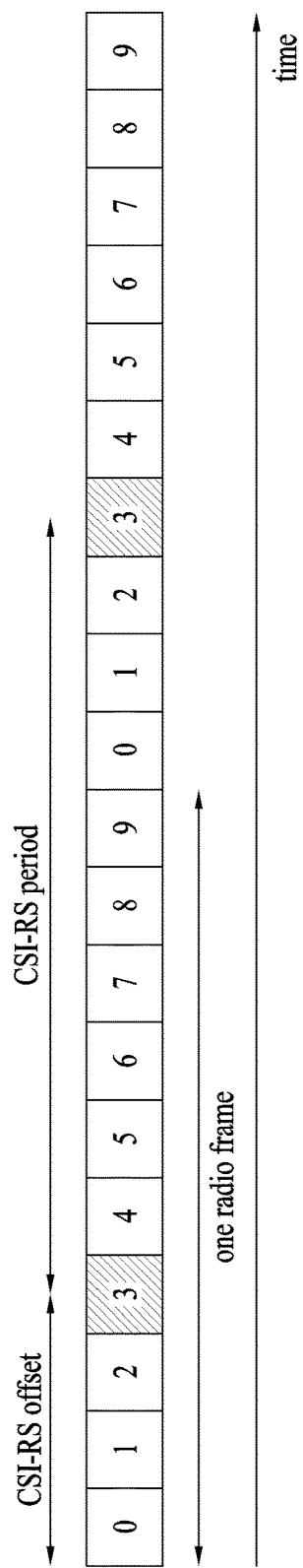
FIG. 9 is a diagram illustrating an example of a method for periodically transmitting a CSI-RS.

FIG. 9 is a diagram illustrating an example of periodically transmitting a CSI-RS. The CSI-RS may be transmitted periodically with a period (for example, a period of 5 subframes, a period of 10 subframes, a period of 20 subframes, a period of 40 subframes, or a period of 80 subframes) of an integer multiple of one subframe.

In FIG. 9, one radio frame includes 10 subframes (subframe numbers 0 to 9). For example, in FIG. 9, a transmission period of the CSI-RS of the base station is 10 ms (that is, 10 subframes), and CSI-RS transmission offset is 3. Each offset value may be varied for each base station, whereby CSI-RSs of various cells may uniformly be distributed on the time. If the CSI-RS is transmitted with a period of 10 ms, the offset value may have one of 0 to 9. Similarly, if the CSI-RS is transmitted with a period of 5 ms, the offset value may have one of 0 to 4, if the CSI-RS is transmitted with a period of 20 ms, the offset value may have one of 0 to 19, if the CSI-RS is transmitted with a period of 40 ms, the offset value may have one of 0 to 39, and if the CSI-RS is transmitted with a period of 80 ms, the offset value may have one of 0 to 79. This offset value represents a value of a subframe at which the base station starts CSI-RS transmission with a predetermined period. If the base station notifies the UE of a transmission period and offset value of the CSI-RS, the UE may receive the CSI-RS of the base station at the location of the corresponding subframe by using the notified value. The UE measures a channel through the received CSI-RS, and as a result, may report information such as CQI, PMI and/or RI (Rank Indicator) to the base station. Herein, CQI, PMI and RI may collectively be referred to as CQI (or CSI) except that CQI, PMI and RI are described separately. Also, the transmission period and offset of the CSI-RS may separately be designated per CSI-RS configuration.

Figure 10:
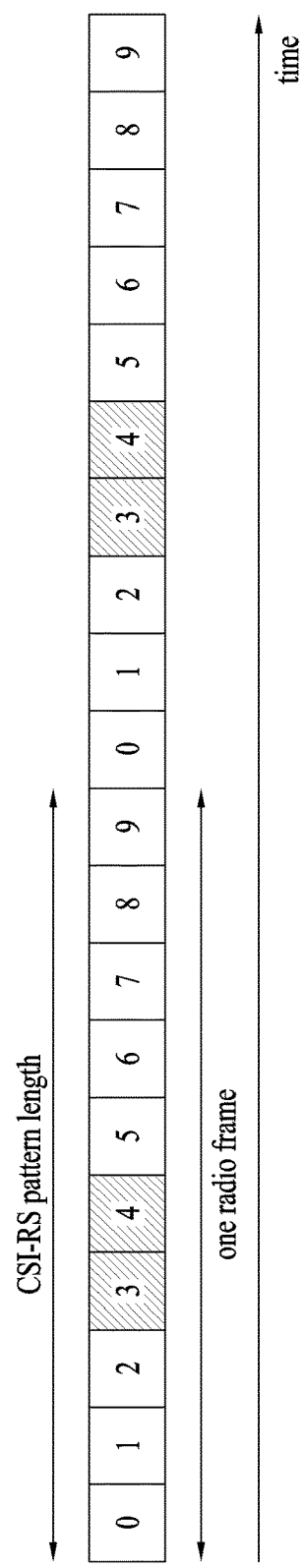
FIG. 10 is a diagram illustrating an example of a method for non-periodically transmitting a CSI-RS.

FIG. 10 is a diagram illustrating an example of non-periodically transmitting a CSI-RS. In FIG. 10, one radio frame includes 10 subframes (subframe numbers 0 to 9). A subframe to which the CSI-RS is transmitted may be represented by a specific pattern as shown in FIG. 10. For example, a CSI-RS transmission pattern may be configured in a unit of 10 subframes, and CSI-RS transmission at each subframe may be designated by a 1-bit indicator. A CSI-RS pattern transmitted at subframe indexes 3 and 4 within 10 subframes (subframe indexes 0 to 9) is shown in the example of FIG. 10. The indicator may be provided to the UE through higher layer signaling.

Various configurations for CSI-RS transmission may be configured as described above. In order that the UE performs channel measurement by normally receiving the CSI-RS, the base station needs to notify the UE of CSI-RS configuration. Embodiments of the present invention related to notification of CSI-RS configuration to the UE will be described hereinafter.

Notification Scheme of CSI-RS Configuration

Generally, as schemes for enabling a base station to notify a UE of CSI-RS configuration, two schemes may be considered as follows.

The first scheme is that the base station broadcasts information on CSI-RS configuration to UEs by using dynamic broadcast channel (DBCH) signaling.

In the legacy LTE system, when notifying the UEs of a message related to system information, the base station may generally transmit the corresponding information through a BCH (Broadcast Channel). If the base station cannot transmit the message related to the system information through the BCH only due to too much message related to the system information, the base station may transmit the system information like general downlink data, wherein PDCCH CRC of corresponding data is masked using system information identifier (SI-RNTI) not a specific UE identifier (for example, C-RNTI) to transmit the system information. In this case, the actual system information is transmitted on a PDSCH region like general unicast data. Therefore, all the UEs in a cell may decode a PDCCH by using SI-RNTI and then acquire system information by decoding a PDSCH indicated by the corresponding PDCCH. The broadcasting scheme as above may be referred to as DBCH (Dynamic BCH) to be identified from PBCH (Physical BCH) which is a general broadcasting scheme.

Meanwhile, the system information broadcasted in the legacy LTE system may be categorized into two types. One type is a master information block (MIB) transmitted through the PBCH, and the other one type is a system information block (SIB) transmitted by being multiplexed with general unicast data on the PDSCH region. Since information transmitted as SIB type 1 to SIB type 8 (SIB1 to SIB8) is defined in the legacy LTE system, a new SIB type may be defined for information on CSI-RS configuration, which is new system information which is not defined in the legacy SIB types. For example, SIB9 to SIB10 may be defined, whereby the base station may notify the UEs within a cell of information on CSI-RS configuration in accordance with the DBCH scheme.

The second scheme is that the base station broadcasts information on CSI-RS configuration to each UE by using RRC (Radio Resource Control) signaling. That is, information on CSI-RS configuration may be provided to each of the UEs within a cell by using dedicated RRC signaling. For example, while the UE is establishing connection with the base station through initial access or handover, the base station may broadcast CSI-RS configuration to the corresponding UE through RRC signaling. Alternatively, when transmitting RRC signaling message, which requests the UE of channel state feedback based on CSI-RS measurement, to the UE, the base station may notify the corresponding UE of CSI-RS configuration through the corresponding RRC signaling message.

Indication of CSI-RS Configuration

A plurality of CSI-RS configurations may be used by a given base station, and the base station may transmit a CSI-RS based on each CSI-RS configuration to the UE on a predetermined subframe. In this case, the base station may notify the UE of the plurality of CSI-RS configurations, and may notify the UE of CSI-RS which will be used for channel state measurement for CQI (Channel Quality Information) or CSI (Channel State Information) feedback.

The embodiment related to indication of CSI-RS configuration, which will be used by the UE, and of a CSI-RS, which will be used for channel measurement, from the base station will be described hereinafter.

Figure 11:
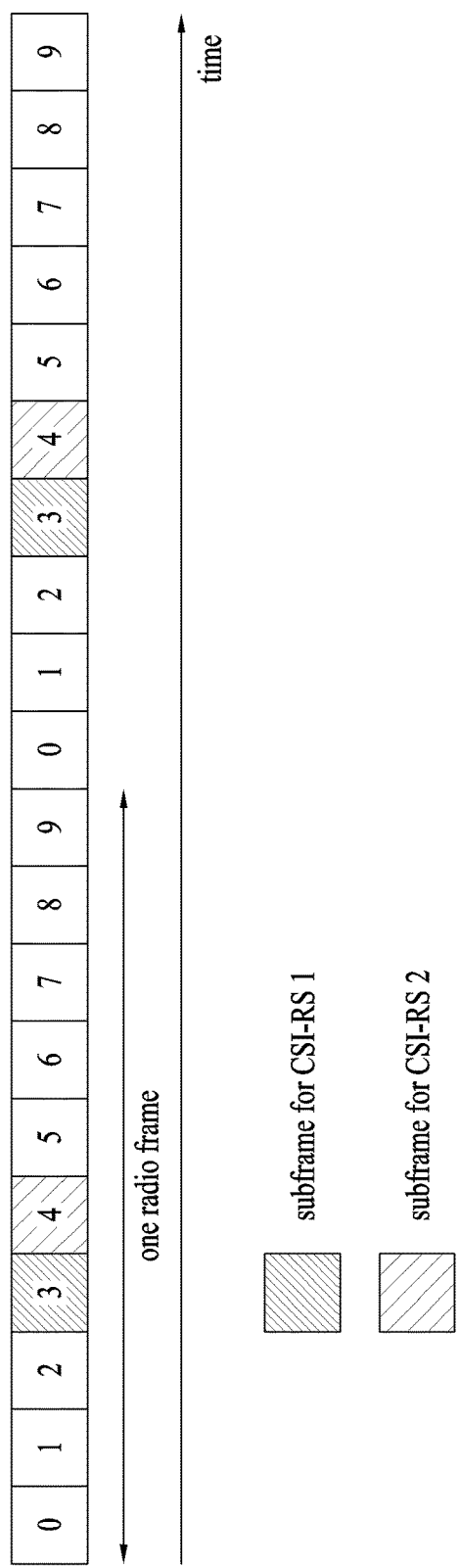
FIG. 11 is a diagram illustrating an example of two CSI-RS configurations which are used.

FIG. 11 is a diagram illustrating an example of two CSI-RS configurations which are used. FIG. 11 illustrates that one radio frame includes 10 subframes (subframe numbers 0 to 9). In FIG. 11, a first CSI-RS configuration, that is, a CSI-RS1 has a CSI-RS transmission period of 10 ms and a CSI-RS transmission offset of 3. In FIG. 11, a second CSI-RS configuration, that is, a CSI-RS2 has a CSI-RS transmission period of 10 ms and a CSI-RS transmission offset of 4. The base station may notify the UE of information on two CSI-RS configurations, and may notify the UE which one of the two CSI-RS configurations will be used for CQI (or CSI) feedback.

If the UE receives a request of CQI feedback for a specific CSI-RS configuration from the base station, the UE may perform channel state measurement by using a CSI-RS only which belongs to the corresponding CSI-RS configuration. In more detail, the channel state is determined by CSI-RS received quality and a function of the amount of noise/interference and a correlation coefficient, wherein CSI-RS received quality is measured by using the CSI-RS only which belongs to the corresponding CSI-RS configuration, and the amount of noise/interference and the correlation coefficient (for example, interference covariance matrix indicating a direction of interference) may be measured at a corresponding CSI-RS transmission subframe or designated subframes. For example, in the embodiment of FIG. 11, if the UE receives a request of feedback on the first CSI-RS configuration (CSI-RS1) from the base station, the UE may perform received quality measurement by using the CSI-RS transmitted at the fourth subframe (subframe index 3) of one radio frame, and may be designated to separately use an odd numbered subframe to measure the amount of noise/interference and the correlation coefficient. Alternatively, the UE may be designated to perform CSI-RS received quality measurement and measure the amount of noise/interference and the correlation coefficient by being restricted to a specific single subframe (for example, subframe index 3).

For example, received signal quality measured using the CSI-RS may be expressed briefly by $S/(I+N)$ (wherein S is strength of a received signal, I is the amount of interference, and N is the amount of noise) as a signal-to-interference plus noise ratio (SINR). S may be measured through the CSI-RS at a subframe that includes the CSI-RS transmitted to the corresponding UE. Since I and N are varied depending on the amount of interference from a neighboring cell, a direction of a signal from the neighboring cell, etc., I and N may be measured through a CRS transmitted at a subframe that measures S or a subframe which is designated separately.

In this case, measurement of the amount of noise/interference and the correlation coefficient may be performed at the resource element (RE) to which the CRS or CSI-RS within the corresponding subframe is transmitted, or may be performed through a null RE configured to facilitate measurement of noise/interference. In order to measure noise/interference at the CRS or CSI-RS RE, the UE first recovers the CRS or CSI-RS and then removes the recovered result from the received signal to allow noise and interference signals only to remain, whereby a statistic value of noise/interference may be obtained. The null RE means an empty RE (that is, RE of which transmission power is 0 (zero)) where the corresponding base station does not transmit any signal, and facilitates signal measurement from another base station except the corresponding base station. Although all of the CRS RE, the CSI-RS RE and the null RE may be used to measure the amount of noise/interference and the correlation coefficient, the base station may designate REs, which will be used to measure noise/interference, for the UE. This is because that it is required to appropriately designate RE which will be measured by the corresponding UE depending on whether a signal of a neighboring cell, which is transmitted to the location of the RE where the UE performs measurement, is a data signal or a control signal. Since the signal of the neighboring cell, which is transmitted to the location of the corresponding RE, is varied depending on inter-cell synchronization, CRS configuration, and CSI-RS configuration, the base station may identify the corresponding signal and then designate the RE, which will perform measurement, for the UE. That is, the base station may designate all or some of the CRS RE, the CSI-RS RE and the null RE for the UE to measure noise/interference by using the designated RE(s).

For example, the base station may use the plurality of CSI-RS configurations, and may notify the UE of a CSI-RS configuration and a location of a null RE, which will be used for CQI feedback, while notifying the UE of one or more CSI-RS configurations. The CSI-RS configuration which will be used for CQI feedback by the UE may be expressed as CSI-RS configuration transmitted at a non-zero transmission power in view of an aspect identified from the null RE transmitted at a transmission power of 0. For example, the base station may notify the UE of one CSI-RS configuration through which the UE will perform channel measurement, and the UE may assume that the CSI-RS is transmitted at a non-zero transmission power in the one CSI-RS configuration. Additionally, the base station may notify the UE of the CSI-RS configuration transmitted at a transmission power of 0, and the UE may assume that the location of the RE of the corresponding CSI-RS corresponds to the transmission power of 0. In other words, the base station may notify the UE of the location of the corresponding null RE if the CSI-RS configuration of the transmission power of 0 exists while notifying the UE of one CSI-RS configuration of the non-zero transmission power.

As a modified example of the aforementioned indication of the CSI-RS configuration, the base station may notify the UE of the plurality of CSI-RS configurations, and may notify the UE of all or some of the CSI-RS configurations, which will be used for CQI feedback. Therefore, the UE which is requested CQI feedback for the plurality of CSI-RS configurations may measure CQI by using the CSI-RS corresponding to each CSI-RS configuration and transmit the measured CQI information to the base station.

Otherwise, the base station may designate uplink resources required for CQI transmission previously for each CSI-RS configuration, whereby the UE may transmit CQI for each of the plurality of CSI-RS configurations to the base station. Information on designation of the uplink resources may previously be provided to the UE through RRC signaling.

Otherwise, the base station may dynamically trigger CQI for each of the plurality of CSI-RS configurations to allow the UE to transmit the CQI to the base station. Dynamic triggering of CQI transmission may be performed through the PDCCH. A corresponding CSI-RS configuration for which CQI measurement will be performed will be notified to the UE through the PDCCH. The UE that has received the PDCCH may feed the result of CQI measurement for the CSI-RS configuration designated in the corresponding PDCCH back to the base station.

A transmission timing of the CSI-RS corresponding to each of the plurality of CSI-RS configurations may be designated such that the CSI-RS is transmitted at different subframes or the same subframe. If CSI-RS transmission based on different CSI-RS configurations is designated at the same subframe, it is required to identify the CSI-RSs from one another. In order to identify the CSI-RSs based on different CSI-RS configurations from one another, one or more of time resources, frequency resources and code resources of CSI-RS transmission may be applied differently. For example, the location of the RE where the CSI-RS is transmitted at the corresponding subframe may be designated differently (for example, the CSI-RS based on one CSI-RS configuration is transmitted at the location of the RE in FIG. 8(a), and the CSI-RS based on the other CSI-RS configuration is transmitted at the location of the RE in FIG. 8(b) at the same subframe) for each CSI-RS configuration (identification based on time and frequency resources). Alternatively, if CSI-RSs based on different CSI-RS configurations are transmitted at the same location of the RE, CSI-RS scrambling codes may be used differently for different CSI-RS configurations, whereby the CSI-RSs may be identified from one another (identification based on code resources).

Quasi Co-Located (QC)

The UE may receive data from a plurality of transmission points (TPs), for example, TP 1 and TP2. Therefore, the UE may transmit channel state information on the plurality of TPs. In this case, RSs may be transmitted from the plurality of TPs to the UE. At this time, if properties for channel estimation from different RS ports of different TPs are shared between the TPs, load and complexity of receiving processing of the UE may be lowered. Moreover, if properties for channel estimation from different RS ports of the same TP are shared between the RS ports, load and complexity of receiving processing of the UE may be lowered. In this respect, the LTE-A system suggests a method for sharing properties for channel estimation between RS ports.

For channel estimation between RS ports, the LTE-A system has introduced the concept of "quasi co-located (QCL)". For example, if a large-scale property of a radio channel to which a symbol is transmitted through one antenna port is inferred from a radio channel to which a symbol is transmitted through another antenna port, the two antenna ports may be quasi co-located. In this case, the large-scale property includes one or more of delay spread, Doppler spread, Doppler shift, average gain, and average delay. Hereinafter, the quasi co-located will simply be referred to as QCL.

In other words, if the two antenna ports are subjected to QCL, it means that the large-scale property of the radio channel from one antenna port is the same as that of a radio channel from the other one antenna port. If the antenna ports to which two different types of RSs are transmitted are subjected to QCL, the large-scale property of the radio channel from one antenna port may be replaced with that of a radio channel from the other one antenna port.

In accordance with the concept of QCL, the UE cannot assume the same large-scale property between radio channels from non-QCL antenna ports. That is, in this case, the UE should perform independent processing for each non-QCL antenna port configured for timing acquisition tracking, frequency offset estimation and compensation, delay estimation and Doppler estimation.

It is advantageous in that the UE may perform the following operations for antenna ports that may assume QCL. First of all, the UE may use the result of delay spread, Doppler spectrum, and Doppler spread estimation for a radio channel from one antenna port during channel estimation for a radio channel from another antenna port. Next, regarding frequency shift and received timing, the UE may perform time and frequency synchronization for one antenna port and then apply the same synchronization to demodulation of another antenna port. Next, regarding average received power, the UE may average RSRP (Reference Signal Received Power) measurement for two or more antenna ports.

If the UE receives a DMRS-based downlink-associated DCI format through a control channel (PDCCH or ePDCCH), the UE performs channel estimation for the corresponding PDSCH through DMRS sequence and then performs data demodulation. For example, if a configuration of a DMRS port received by the UE from a downlink scheduling grant may be subjected to QCL assumption with a CRS port, the UE may apply an estimation value of a large-scale property of a radio channel estimated from the CRS port during channel estimation through the corresponding DMRS port as it is. This is because that the estimation value for the large-scale property may be acquired from the CRS more stably because the CRS is a reference signal broadcasted at a relatively high density over a full band per subframe. On the other hand, the DMRS is transmitted UE-specifically for a specific scheduled RB, and a precoding matrix used for transmission by the base station may be varied in a unit of PRG, whereby a valid channel received by the UE may be varied in a unit of PRG. Therefore, performance degradation may be generated when the DMRS is used for estimation of the large-scale property of the radio channel over a broad band. Since the CSI-RS has a relatively long transmission period and low density, performance degradation may also be generated when the CSI-RS is used for estimation for the large-scale property of the radio channel.

That is, QCL assumption between the antenna ports may be used for reception of various downlink reference signals, channel estimation, channel state report, etc.

Method for Cancelling Interference

Figure 12:
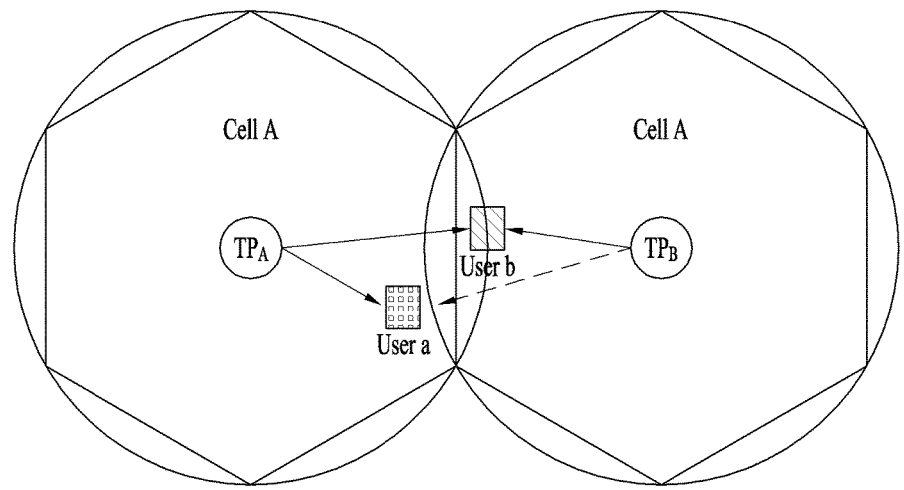
FIG. 12 is a diagram illustrating a general interference environment of a downlink system.

FIG. 12 is a diagram illustrating a general interference environment of a downlink system.

For convenience of description, a cell controlled by a TP A will be referred to as a cell A, and a user equipment which performs communication with the TP A will be referred to as UE a. Likewise, a cell B and a UE b exist for a neighboring TP B. Since the cell A and the cell B use the same radio resource, the UE b which is located at the cell edge is subjected to interference from the cell A. Hereinafter, the cell A will be referred to as an interference cell, the TP A will be referred to as an interfering TP, the cell B will be referred to as a serving cell, the TP B will be referred to as a serving TP, and the UE b will be referred to as an NAICS UE. The NAICS UE may increase a data received rate by cancelling an interference signal from the interference cell.

The NAICS UE should know various kinds of information (IP, interference parameter) for the interference signal to effectively cancel interference. For example, in an NAICS environment which is independent from a transmission mode (TM), information of CFI, MBSFN configuration, RI, CRS AP, Cell ID, Modulation order, MCS, RNTI, and TM is required. In case of an NAICS environment of CRS TM, information of PMI, Data to RS EPRE, PA, PB, System bandwidth, and PDSCH allocation is required. Also, in case of an NAICS environment of DM-RS TM, information of PDSCH bandwidth for DM-RS, Data to RS EPRE, PB, DMRS APs, nSCID, CSI-RS presence and their pattern, and Virtual cell ID is required.

The NAICS UE cancels the interference signal by receiving the aforementioned information on the interference signal through the serving TP or the interfering TP or discovering the information through blind detection (BD). However, signaling overhead and complexity may be increased to receive all interference parameters (IP) which are required. Also, if BD is performed for some of the IP, an incorrect value may be detected, whereby the interference signal may not be canceled normally.

As a solution, values of some of the IP may be restricted previously through network coordination. In more detail, a method for previously restricting values of IP through network coordination will be suggested as follows.

First Embodiment

First of all, according to the first embodiment, the number of interference layers can be restricted.

In more detail, the number of interference layers may be restricted to satisfy two conditions as follows. An interfering base station determines the number of interference layers, which satisfies one of the following two conditions or both of them, by receiving the number of desired layers and the number of receiving antennas of an NAICS UE from a serving base station.

The first condition is that the number of interference layers reaches the number of desired layers or less.

The number of data layers of the interfering TP should be set to reach the number of layers of desired data or less. Generally, since a magnetic channel is stronger than the interfering channel, it is required to set the number of layers of desired data to a maximum value of a data layer of the interfering TP. Also, since the number of layers of a magnetic signal is leveled up by reflecting the effect of interference cancellation but the interference signal is demodulated or decoded in a state that the magnetic signal exists as interference, it is preferable that the number of interference layers is set to be smaller than the number of layers of the magnetic signal.

The serving base station determines the number of layers of a desired signal transmitted to the NAICS UE and then forwards the determined resultant value to the interfering base station, whereby the interfering base station should set the number of layers for its DL data to the determined resultant value or less. The NAICS UE performs BD for an interference signal rank corresponding to the determined resultant value or less with reference to a rank of desired data from DCI.

The second condition is that the number of interference layers reaches a value, which is obtained by subtracting the number of desired layers from the number of receiving antennas, or less.

A maximum rank for transmission and reception in an M by N SISO channel is determined by min (M, N) corresponding to degree of freedom of a channel. Based on this theoretical background, the base station generally sets a rank to a minimum value or less of the number of transmitting antennas and the number of receiving antennas of the UE and then transmits data to the UE. However, since the NAICS UE should perform demodulation or decoding for the interference signal as well as its data, it may be difficult to cancel interference in accordance with a rank of the interference signal even through the rank of the desired signal is determined normally. Therefore, the NAICS UE may normally perform interference cancellation when a sum of a rank for data of the NAICS UE and a rank of the interference signal is set to a receiving spatial domain of the NAICS UE, that is, the number of receiving antennas or less.

The serving base station determines the number of layers of the desired signal transmitted to the NAICS UE and then forwards the determined value and the number of receiving antennas of the NAICS UE or "the number of receiving antennas of the NAICS UE—the number of layers of the desired signal" to the interfering base station. Therefore, the interfering base station may set the number of layers for its DL data to "the number of receiving antennas of the NAICS UE—the number of layers of the desired signal" or less. The NAICS UE performs BD for an interference signal rank corresponding to a value of 'the number of its receiving antennas—the number of layers of the desired signal' or less with reference to a rank of desired data from DCI.

Although the above two conditions express the maximum value of the number of interference layers, the number of interference layers may be determined directly based on the number of receiving antennas and the number of desired layers. That is, "the number of receiving antennas—the number of desired layers" may be set to the number of interference layers, or the number of desired layers may be set to the number of interference layers. In this case, the UE can calculate the number of interference layers without BD.

The above two conditions may be normalized to set the number of interference layers to a function of the number of receiving antennas and the number of desired layers. That is, the number of interference layers is scheduled to be smaller than a function value based on the number of receiving antennas and the number of desired layers between the base station and the UE, and the UE can reduce BD candidates of the number of interference layers in accordance with the scheduled value. If the number of interference layers not the maximum value of the number of interference layers is determined directly by the above two factors, that is, if the number of interference layers is determined by a function value based on the number of receiving antennas and the number of desired layers, the UE can calculate the number of interference layers without BD.

More similarly, the number of interference layers may be fixed to 1 or limited to N or less. For example, if a specific subframe for performing NAICS is determined previously, the interfering base station may fix the number of interference layers to 1 or limit the number of interference layers to N or less at the corresponding subframe. The NAICS UE performs ICS by assuming the number of interference layers to 1 at the corresponding subframe or assuming the number of interference layers to N or less.

Second Embodiment

According to the second embodiment, a modulation order or a modulation and coding scheme of interference data can be restricted.

In more detail, the modulation order or the modulation and coding scheme of the interference signal can be restricted to satisfy the following conditions. The interfering base station determines the modulation order/MCS of the interference signal, which satisfies the following condition, by receiving a modulation order/MCS of a desired signal from the serving base station.

The restriction condition is that the modulation order/MCS of the interference signal is restricted to the modulation order/MCS or less of the desired signal.

A modulation order/MCS of the interfering TP should be set to a modulation order/MCS of the desired data. Generally, since the magnetic channel is stronger than the interfering channel, it is required to set the modulation order/MCS of the desired data to set a maximum value of the modulation order/MCS of the interfering TP. Also, although the modulation order/MCS of the magnetic signal is leveled up by reflecting interference cancellation effect, the interference signal is demodulated or decoded in a state that the magnetic signal exists as interference. Therefore, it is preferable that the modulation order/MCS of the interference signal is set to be smaller than the modulation order/MCS of the magnetic signal.

The serving base station determines the modulation order/MCS of the desired signal transmitted to the NAICS UE and then forwards the determined result to the interfering base station. The interfering base station sets the modulation order/MCS for its DL data to the modulation order/MCS or less of the desired signal. The NAICS UE performs BD for the modulation order/MCS value or less of the desired signal with reference to the modulation order/MCS of the desired data from the DCI when performing BD for the modulation order/MCS of the interference signal.

Although the above condition restricts the maximum value of the modulation order/MCS of the interference signal, the modulation order/MCS value of the interference signal may be determined based on the modulation order/MCS of the desired signal. That is, network coordination may be performed such that the modulation order/MCS of the desired signal may be set to the modulation order/MCS of the interference signal. At this time, the UE can calculate the modulation order/MCS of the interference signal without BD.

The above condition may be normalized such that the modulation order/MCS of the interference signal may be set to the function of the modulation order/MCS of the desired signal. That is, it is scheduled between the base station and the UE that the modulation order/MCS of the interference signal is smaller than the function based on the modulation order/MCS of the desired signal, and the UE can reduce BD candidates of the modulation order/MCS of the interference signal in accordance with the scheduled value. Also, the modulation order/MCS of the interference signal is determined by a function value based on the demodulation order/MCS of the desired signal, the UE can calculate the demodulation order/MCS of the interference signal without BD.

More similarly, the modulation order/MCS of the interference signal may be limited to N or less. For example, if a specific subframe for performing NAICS is determined previously, the interfering base station restricts modulation to QPSK at the corresponding subframe. The NAICS UE performs ICS by assuming modulation of the interference signal at the corresponding subframe as QPSK.

Third Embodiment

According to the third embodiment, precoding of interference data can be restricted.

In order that the NAICS UE cancels an interference signal by normally performing demodulation and decoding, a received power of the interference signal should be high. Therefore, if the UE feeds back optimized PMI for optimizing channel gain by measuring a channel with an interference cell, the interfering base station determines precoding with reference to the feedback value. The PMI feedback may directly be forwarded from the UE to the interfering base station, or may be forwarded to the interfering base station through a backhaul link after being forwarded from the UE to the serving base station.

The UE can determine the interference cell PMI based on the number of interference layers according to the first embodiment. For example, the UE determines the interference cell PMI by assuming a value obtained by subtracting the number of layers of desired data from the number of receiving antennas as the number of interference layers. Alternatively, the UE can calculate the interference cell PMI by assuming a rank as 1. The interference cell that has received the PMI performs precoding by using the PMI. The UE assumes that the interference cell has performed precoding to the interference cell PMI prior to a subframe n-N when performing NAICS at a subframe n. Alternatively, signaling indicating whether the interference cell has performed precoding for an interference cell PMI most recently reported prior to the subframe n may be added when the UE performs NAICS at the subframe n. This signaling may be added within the DCI as 1 bit. If the corresponding value is '1', the UE assumes that the interference cell has performed precoding to the interference cell PMI most recently reported prior to the subframe n.

Also, the UE may report a plurality of PMIs without reporting a specific PMI only to the interfering base station. As the plurality of PMIs are reported to the interfering base station, the interfering base station can select the optimized PMI of more PMIs. For example, the UE reports PMI causing the strongest interference and PMI causing the second strong interference to the interfering base station. Alternatively, the UE reports interference PMI assuming a rank 1 and interference PMI assuming a rank 2 to the interfering base station. The interfering base station that has received the interference PMIs can perform scheduling for one of the two PMIs. The UE discovers an interference cell precoder by performing BD for the two interference cell PMIs reported prior to the subframe n-N when performing NAICS at the subframe n.

Although the UE has reported the interference PMI causing the strongest interference as above, the UE may report PMI causing weakest interference. In this case, the interfering base station performs precoding by using either this PMI causing the weakest interference or one of a set of PMIs having low correlation with the PMI causing the weakest interference. If the interfering base station performs precoding by using one of a set of PMIs having low correlation with the PMI causing the weakest interference, the UE discovers an interference cell precoder by performing BD for a PMI set having low correlation with respect to the interference cell PMI reported prior to the subframe n-N when performing NAICS at the subframe n. PMI set information having low correlation with respect to a specific PMI may previously be shared between the base station and the UE. Alternatively, when the UE performs NAICS at the subframe n, signaling indicating whether the interference cell has performed precoding by using the interference PMI set most recently reported prior to the subframe n may be added. This signaling may be added within the DCI as 1 bit. If the corresponding value is '1', the UE assumes that the interference cell has performed precoding by using the interference cell PMI most recently reported prior to the subframe n, and may reduce a target for BD.

The interference PMI may be fixed regardless of the interfering channel more simply than a method for determining interference PM in accordance with an interference channel between the NAICS UE and the interfering base station. For example, if a subframe for performing NAICS is scheduled previously between the base station and the UE, PMI, which may be used by the interference cell, may be fixed at the corresponding subframe. That is, PMI that may be used for RB i by the interference cell at the subframe for performing NAICS is limited to PMI set i. The UE discovers a precoder, which is used by the interference cell, by performing BD for the PMI set i when performing NAICS at RB i. For example, the interference cell may be restricted that the interference cell uses an even numbered PMI only at an even numbered RB and uses an odd numbered PMI only at an odd numbered RB.

Fourth Embodiment

According to the fourth embodiment, a PDSCH starting symbol can be restricted.

The NAICS UE may discover interference PDSCH starting symbol information by performing BD for a PCIFCH of the interference cell. However, the NAICS UE may not discover interference PDSCH starting symbol information as the case may be. For example, when the interference cell performs CA by using two CCs and cross carrier scheduling is performed, a PDSH starting symbol of an Scell cannot be derived from the PCIFCH. This is because that the interference cell UE served from the Scell is separately configured for the PDSCH starting symbol through RRC, and the PDSCH starting symbol is determined in accordance with this value. For another example, if the interference cell transmits EPDCCH, the PDSCH starting symbol is determined at the same symbol as an EPDCCH starting symbol of the interference cell.

Considering this case, the base station may perform RRC indication to the NAICS UE, which indicates whether an interference PDSCH starting symbol can be derived by the interference PCFICH. That is, if a bit value through RRC is 1, the NAICS UE determines that the interference PDSCH starting symbol can be derived by the interference PCFICH, and performs interference PCFICH BD. If the bit value is 0, the NAICS UE determines that the interference PDSCH starting symbol cannot be derived by the interference PCFICH and does not perform BD for the interference PCFICH. In case of the latter case, the NAICS UE may discover the PDSCH starting symbol through BD or assume a maximum number of interference PDSCH symbols and assume next symbol as the PDSCH starting symbol.

Whether the interference PDSCH starting symbol can be derived by the interference PCFICH can be defined in the NAICS UE as one state together with a PDSCH IC starting symbol as illustrated in Table 3 below.

TABLE 3

| bit fields | descriptions |
|---|---|
| 001 | follow PCFICH |
| 010 | n = 2 |
| 011 | n = 3 |
| 100 | n = 4 |
| 101 | n = 5 |

TABLE 3-continued

| bit fields | descriptions |
|---|---|
| 000, 110, 111 | reserved |

In Table 3, a bit field 001 illustrates that BD is performed for the PCFICH.

The PDSCH IC starting symbol may be defined that the interference cell does not assure transmission of the PDSCH for next symbol including a symbol n instead of indicating an actual PDSCH starting position used by the interference cell. That is, PDSCH transmission may be performed or not prior to the symbol n. Therefore, TP can dynamically change the actual PDSCH starting position within the range of symbols 1 to n. As a result, the UE may try to cancel interference from the PDSCH IC starting symbol without performing BD for the PCFICH.

Figure 13:
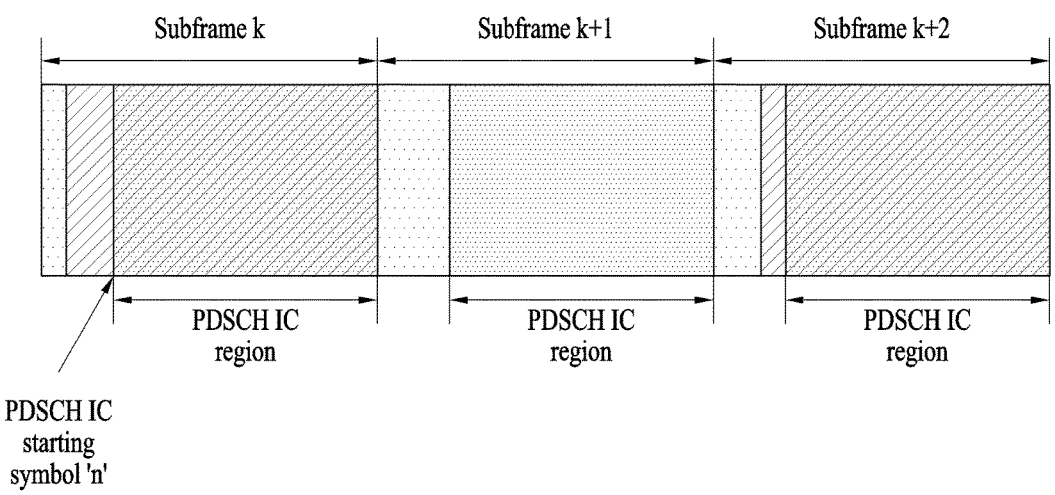
FIG. 13 is a diagram illustrating an example of PDSCH interference cancellation based on a PDSCH IC starting symbol according to the present invention.

FIG. 13 is a diagram illustrating an example of PDSCH interference cancellation based on a PDSCH IC starting symbol according to the present invention.

Referring to FIG. 13, if a symbol is configured for the NAICS UE as the PDSCH IC starting symbol, the UE may try to cancel interference in a PDSCH IC region of the interference PDSCH regardless of the actual PDSCH starting position.

The symbol n transmitted in the state of Table 3 may be configured as the PDSCH starting symbol, which is used by the actual interfering base station, not the PDSCH IC starting symbol.

Alternatively, when the UE transmits the PDSCH IC starting symbol only through RRC signaling as illustrated in Table 4 below and derives the interference PDSCH starting symbol through the interference PCFICH, the UE can be scheduled not to transmit this information. That is, if the UE does not receive information of Table 4, the UE can derive the interference PDSCH starting symbol by performing BD for the interference PCFICH, and the network can assure an environment that the UE can discover interference PDSCH starting symbol information by performing BD for PCFICH of the interference cell.

TABLE 4

| bit fields | descriptions |
|---|---|
| 00 | n = 2 |
| 01 | n = 3 |
| 10 | n = 4 |
| 11 | n = 5 |

Fifth Embodiment

According to the fifth embodiment, QCL can be restricted.

In order to increase channel estimation performance based on interference DM-RS sequence, the base station provides QCL assumption. QCL assumption is to improve channel estimation performance of DM-RS sequence by using channel property value of another RS having channel property the same as or similar to that of the corresponding sequence while having RS density higher than that of DM-RS in estimating a channel of a corresponding interference DM-RS sequence.

More exactly, QCL (Quasi co-location) for each antenna port is defined in the 3GPP standard. Two behaviors are defined for QCL. First of all, a behavior A is that a CRS, a DM-RS and a CSI-RS are transmitted from the serving cell and all the antenna ports have the same channel property. Next, a behavior B is defined that the DM-RS has the same channel property as that of a specific CSI-RS in demodulation of a PDSCH. In the behavior B, QCL with a specific CRS as well as QCL with the DM-RS and the CSI-RS may additionally be signaled to the UE.

Therefore, QCL assumption may be transmitted to each sequence in an interference DM-RS sequence candidate group. Simply, the DM-RS sequence and specific non-zero power CSI-RS index may be mapped.

Since the method according to the present invention is not limited to a CoMP structure defined in the 3GPP Rel-11, CSI-RS index is not limited to the CSI-RS configured for CSI feedback of the UE in the CoMP structure. Since the UE does not need to necessarily perform CSI feedback for the CSI-RS index which is signaled, a problem may occur in that the CSI-RS to be measured by the UE is increased unnecessarily to obtain channel property as information which is helpful for estimation of a specific DM-RS sequence. Therefore, QCL information intended for channel estimation for the interference DM-RS sequence will be understood more preferably with reference to information from a CRS of a specific cell in addition to the CSI-RS. That is, for QCL assumption, the CSI-RS index or PCID of a specific cell may be notified to obtain channel property from the CRS of the corresponding cell.

That is, although the CoMP UE performs DMRS channel estimation by assuming QCL B to receive TM10 service, the NAICS UE may be restricted to perform interference DMRS channel estimation by using QCL A only for TM 10 interference signal.

To this end, the base station may explicitly transmit RRC indication, which indicates whether QCL A can be used for TM10 interference, to the NAICS UE.

Alternatively, the following method may be considered without explicit indication. The base station may select an interference CRS and an interference DMRS, which may be connected to QCL A, and may notify information of the corresponding DMRS as network assistance information. In this case, since the base station assures QCL A of the interference DMRS, the UE discovers delay spread, Doppler spread, Doppler shift and average delay information from the CRS associated with DMRS VCID (virtual cell ID) by always assuming QCL A when performing NAICS for the TM10 interference signal, and then uses the discovered information for DMRS channel estimation.

For example, the base station sends interference CRS assistance information and DMRS assistance information as shown in FIGS. 14 and 15, and notifies DMRS and CRS subjected to QCL A through qcl-CRS-Info. The UE performs BD for interference VCID and then discovers the interference CRS subjected to QCL through qcl-CRS-Info of the detected VCID. At this time, the UE assumes that the DMRS of the corresponding VCID is always connected to the corresponding CRS through QCL A.

As described above, the UE always assumes QCL A for a DMRS based interference PDSCH, that is, an interference PDSCH transmitted using some of ports 7 to 14, and assumes that the corresponding DMRS is quasi collocated with its associated CRS with respect to delay spread, Doppler spread, Doppler shift and average delay.

If DPS is assumed among 3 TPs in CoMP, at least two of the 3 TPs share the same DMRS VCID (virtual cell ID) according to the current LTE standard. For example, TP1, TP2 and TP3 join 3TP CoMP, and TP1 and TP2 may share VCID 100. In this case, if the NAICS UE, which receives DL service from TP4, cancels interference from TP1 and TP2, the following problem occurs in respect of QCL.

The UE should discover CSI-RS or CRS, which is quasi collocated (QCL) with the corresponding DMRS, after discovering VCID 100 through BD. However, since VCID 100 is a value used by both TP1 and TP2, in case of QCL related NA information received by the UE, VCID 100 is quasi collocated (QCL) with the CSI-RS or CRS of the TP1 and at the same time is quasi collocated (QCL) with the CSI-RS or CRS of the TP2. Therefore, the UE cannot know a TP quasi collocated (QCL) with VCID 100.

To solve this ambiguousness, the UE according to the present invention is not expected to cancel or suppress TM10 interference if VCID and nSCID are associated with multiple CSI-RSs or multiple CRSs.

Alternatively, in order that the base station previously prevents the above information from being transmitted, the following configuration can be made. The UE assumes that QCL transmission is performed only if VCID and nSCID are associated with one CSI-RS or one CRS. Also, the base station transmits QCL information for the NACIS UE only if VCID and nSCID are associated with one CSI-RS or one CRS.

In case of TM10 interference, QCL signaling is necessarily required for TM 10 interference cancellation of the NAICS UE. Therefore, if TM 10 is included in a TM set of network assistance (NA) information given to the UE, the base station should necessarily signal QCL information. To this end, the following configuration can be made. The UE assumes that QCL transmission is performed only if VCID and nSCID are associated with one CSI-RS or one CRS and TM10 exists in a TM subset of NA information set. Also, the base station transmits QCL information for the NACIS UE only if VCID and nSCID are associated with one CSI-RS or one CRS and TM10 exists in a TM subset of NA information set.

Figure 16:
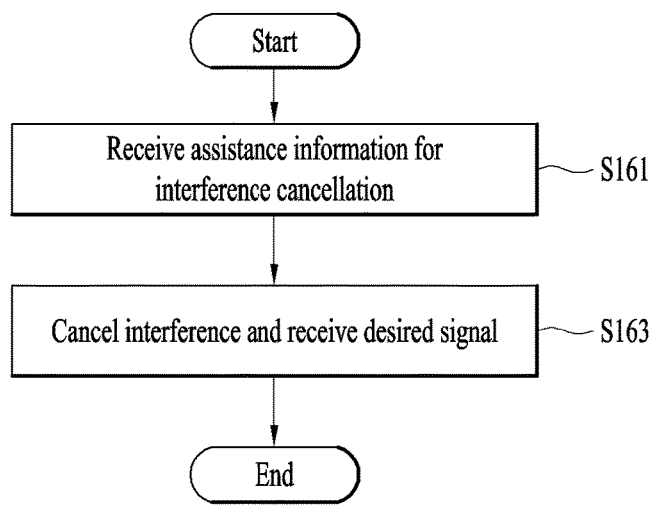
FIG. 16 is a flow chart illustrating a method for receiving a signal, which may be applied to one embodiment of the present invention.

A feedback method according to one embodiment of the present invention will be described with reference to FIG. 16.

In step S161, the UE receives assistance information for cancelling an interference signal transmitted from an interfering base station. In this case, the assistance information is the assistance information for cancelling interference, as described in the first to fifth embodiments, and its technical feature follows the aforementioned description.

In step S162, the UE cancels the interference signal on the basis of the assistance information, and receives a desired signal from the serving base station. A detailed method for cancelling interference by using the assistance information follows the technical features described in the first to fifth embodiments. For example, the UE may assume some of assistance information for cancelling an interference signal as a restricted value and receive the interference signal.

Figure 17:
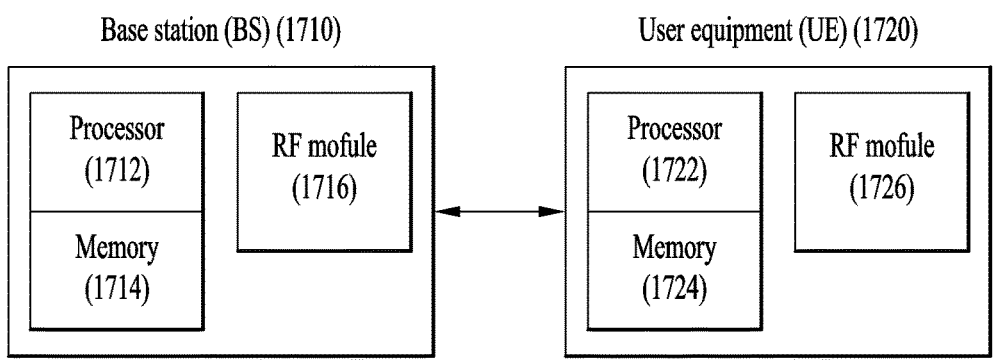
FIG. 17 is a diagram illustrating a base station and a user equipment which may be applied to one embodiment of the present invention.

FIG. 17 is a diagram illustrating a base station and a user equipment, which may be applied to one embodiment of the present invention.

If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 17, the wireless communication system includes a base station 1710 and a user equipment 1720. The base station 1710 includes a processor 1713, a memory 1714, and radio frequency (RF) units 1711 and 1712. The processor 1713 may be configured to implement procedures and/or methods suggested in the present invention. The memory 1714 is connected with the processor 1713 and stores various kinds of information related to the operation of the processor 1713. The RF unit 1716 is connected with the processor 1713 and transmits and/or receives a radio signal. The user equipment 1720 includes a processor 1723, a memory 1724, and radio frequency (RF) units 1721 and 1722. The processor 1723 may be configured to implement procedures and/or methods suggested in the present invention. The memory 1724 is connected with the processor 1723 and stores various kinds of information related to the operation of the processor 1723. The RF units 1721 and 1722 are connected with the processor 1723 and transmit and/or receive a radio signal. The base station 1710 and/or the user equipment 1720 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been herein described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

The present invention may be used for wireless communication devices such as a user equipment, a relay and a base station.

What is claimed is:

1. A method for receiving a signal by a user equipment in a wireless communication system, the method comprising:
   identifying first assistance information associated with an interference signal and second assistance information associated with the interference signal; and
   receiving a desired signal considering the interference signal based on the first assistance information and the second assistance information,
   wherein a number of data layers of the interference signal is limited to 1 or 3 based on the first assistance information, and
   wherein the desired signal is modulated based on the second assistance information.

2. The method of claim 1, wherein the user equipment further assumes that the number of data layers of the interference signal is smaller than or equal to a number of data layers of the desired signal.

3. The method of claim 1, wherein the user equipment further assumes that the number of data layers of the interference signal is smaller than or equal to a value obtained by subtracting a number of data layers of the desired signal from a number of receiving antennas of the user equipment.

4. The method of claim 1, further comprising:
   calculating a precoding matrix index (PMI) of an interfering base station based on the number of data layers of the interference signal.

5. The method of claim 1, further comprising:
   receiving an indication of whether the user equipment can calculate a starting symbol of an interference Physical Downlink Shared Channel (PDSCH) through a Physical Control Format Indicator Channel (PCFICH) of an interfering base station, through Radio Resource Control (RRC) signaling.

6. The method of claim 1, further comprising:
   receiving information on an interference Demodulation Reference Signal DM-RS), which can be connected with a Common Reference Signal (CRS) of an interfering base station according to a Quasi Co-Location (QCL) behavior A.

7. A user equipment configured to receive a signal in a wireless communication system, the user equipment comprising:
   a transceiver; and
   a processor,
   wherein the processor is configured to:
      identify first assistance information associated with an interference signal and second assistance information associated with the interference signal, and
   control the transceiver to receive a desired signal considering the interference signal based on the first assistance information and the second assistance information,
      wherein a number of data layers of the interference signal is limited to 1 or 3 based on the first assistance information, and
      wherein the desired signal is modulated based on the second assistance information.

8. The user equipment of claim 7, wherein the user equipment further assumes that the number of data layers of the interference signal is smaller than or equal to a number of data layers of the desired signal.

9. The user equipment of claim 7, wherein the processor further assumes that the number of data layers of the interference signal is smaller than or equal to a value obtained by subtracting a number of data layers of the desired signal from a number of receiving antennas of the user equipment.

10. The user equipment of claim 7, wherein the processor is further configured to calculate a precoding matrix index (PMI) of an interfering base station based on the number of data layers of the assumed interference signal.

11. The user equipment of claim 7, wherein the processor is further configured to receive an indication of whether a starting symbol of an interference Physical Downlink Shared Channel (PDSCH) can be calculated through a Physical Control Format Indicator Channel (PCFICH) of an interfering base station, through Radio Resource Control (RRC) signaling.

12. The user equipment of claim 7, wherein the processor is further configured to receive information on an interference Demodulation Reference Signal (DM-RS), which can be connected with a Common Reference Signal (CRS) of an interfering base station according to a Quasi Co-Location (QCL) behavior A.

* * * * *